United States Patent
Demars et al.

[11] Patent Number: 6,138,434
[45] Date of Patent: Oct. 31, 2000

[54] GLAZED ELEMENT HAVING A HIGH INSULATING ABILITY

[75] Inventors: Yves Demars, Clermont; Rene Poix, Noyon, both of France

[73] Assignee: Saint-Gobain Vitrage, Coubevoie, France

[21] Appl. No.: 09/049,068

[22] Filed: Mar. 27, 1998

[30] Foreign Application Priority Data

Apr. 11, 1997 [FR] France .................................. 97 04509

[51] Int. Cl.⁷ .................................................. E06B 3/54
[52] U.S. Cl. .................... 52/786.13; 52/171.1; 52/171.3; 52/204.593; 52/235; 52/786.1; 428/34
[58] Field of Search ......................... 52/786.1, 786.13, 52/208, 204.593, 171.3, 235, 171.1; 428/34; 156/109

[56] References Cited

U.S. PATENT DOCUMENTS

| 3,441,924 | 4/1969 | Peek et al. .................. 52/786.13 X |
| 3,594,763 | 7/1971 | Peek .............................. 340/330 |
| 3,990,201 | 11/1976 | Falbel ............................ 52/171.3 |
| 4,581,868 | 4/1986 | McCann ..................... 52/204.593 |
| 4,680,206 | 7/1987 | Yoxon et al. .................. 428/34 |
| 4,689,928 | 9/1987 | Dutton et al. ................. 52/235 |
| 4,893,443 | 1/1990 | Haber. |
| 5,027,567 | 7/1991 | Roberts ................... 52/204.593 X |
| 5,138,804 | 8/1992 | Roberts ................... 52/204.593 X |
| 5,391,411 | 2/1995 | Rowland ................... 52/786.13 X |
| 5,540,514 | 7/1996 | Demars et al. .............. 52/235 X |
| 5,643,644 | 7/1997 | Demars ..................... 52/786.13 X |

FOREIGN PATENT DOCUMENTS

| 0 301 617 | 2/1989 | European Pat. Off. . |
| 506522 | 3/1992 | European Pat. Off. . |
| 645516 | 9/1994 | European Pat. Off. . |
| 655543 | 11/1994 | European Pat. Off. . |
| WO 95/01493 | 1/1995 | WIPO . |
| WO 96/22443 | 7/1996 | WIPO . |

*Primary Examiner*—Laura A. Callo
*Attorney, Agent, or Firm*—Oblon, Spivak, McClelland, Maier & Neustadt, P.C.

[57] ABSTRACT

A glazed element having a high insulating ability is composed of at least two glass sheets, between which a vacuum has been created, separated from each other by mounts distributed over their entire surface. The sheets are joined together around their periphery by an inorganic seal. The glazed element has at least one hole sealed in a vacuum-tight manner around its periphery with the aid of an inorganic seal.

13 Claims, 3 Drawing Sheets

GLAZED ELEMENT HAVING A HIGH INSULATING ABILITY

BACKGROUND OF THE INVENTION

1. Field of the Invention

The invention relates to a glazed element having a high insulating ability and intended to be fastened to a bearing structure. It relates more particularly to the fastening of glazed elements having a high insulating ability to a bearing structure using a technique including fastening the elements by mechanical bolting points usually located at each of their corners.

2. Description of the Related Art

Glazed elements fastened to a bearing structure are known as structural glazings (SG) or bolted exterior glazings. They make it possible to obtain, for example, exterior walls or facades for buildings consisting entirely of glazed elements, some being transparent and others being opaque. Such facades have a minimum of surface discontinuities as seen from outside.

However, achieving an aesthetically pleasing effect must not be made at the expense of the reliability of the fastening system, and the design of the point connections must take into account various requirements from a mechanical standpoint. Thus, the connections must guarantee fastening between the glazed element and the bearing structure which is solid and effective and, in particular, must support the weight of the glazed element without risk of breakage. In addition, the glazed element, once it has been fitted, must be capable of "responding" without breaking to various kinds of stresses, particularly to stresses which will have a tendency to bend it, e.g., those created by wind-type atmospheric conditions. The connections therefore have to allow for a few degrees of bending of the glazed element.

It is usual, to obtain thermal and/or acoustic insulation, to produce insulating glazing panels comprising two substrates separated from each other by a relatively wide air cavity, the sealing of which is provided by a peripheral seal in a known manner. Each of the substrates may be a single glass plate or may have a laminated structure. However, in the case of such multiple glazings, only one of the substrates is conventionally joined to the bearing structure by a fastening system. This raises the risk that the other substrates which are associated with the fastened substrate will overstress the peripheral seals, which are only designed to provide sealing of the assembly, and not to withstand high shear stresses or the weight of these other substrates.

It is therefore important, in the case of multiple glazings, to provide connections between the substrates which make it possible to reduce these stresses at the seals, the purpose of the connections being to transfer at least part of the weight of each substrate not fastened to the structure to the substrate which is fastened thereto.

Various SG glazing fittings have already been proposed. Thus, EP-A-0,506,522 and EP-A-0,655,543 describe systems for mechanically connecting SG glazing panels to their bearing structure, which make it possible to "bolt" the glazed element reliably to its structure while still allowing it to be able to bend in a durable and controlled manner. In the case of multiple glazing, these systems also make it possible to realign the successive holes drilled in each of the panes of the glazing, this being achieved by means of a system of eccentric rings in one of the holes. The flexibility of the glazing is improved using these types of connection, but the manufacture of these fastening systems is quite demanding as there must be perfect matching between the various elements. Great accuracy with regard to dimensioning is therefore necessary, which leads to high manufacturing costs and significant manufacturing complexity.

Moreover, the usual insulating glazing panels provide thermal insulation which is regarded as being unsatisfactory for some applications. In order to remedy this, it is known to produce glazing panels consisting of three glass sheets, in which one of the air cavities is replaced by a gas such as krypton. These glazing panels have markedly proved thermal insulation properties but have a thickness and weight which make them difficult to use in SG type arrangements.

SUMMARY OF THE INVENTION

It is an object of the invention to overcome these drawbacks by providing a novel type of SG glazing with a high insulating ability, in which the "bolting" of the glazing to the bearing structure is secure while still allowing it to bend in a durable manner.

It is a further object of the invention to provide an SG glazing which is thin and lightweight, and whose fastening system can be cheaply and simply made.

The above and other objects can be achieved by a glazed element having a high insulating ability and composed of at least two glass sheets between which a vacuum has been created, separated from each other by mounts distributed over the entire surface, these sheets being joined together around their periphery by an inorganic seal, this glazed element having at least one hole, the hole being sealed in a vacuum-tight manner around its periphery with the aid of an inorganic seal.

The conventional insulating glazing panels are therefore replaced with an insulating glazing panel consisting of at least two glass sheets between which a vacuum has been created. The insulating glazing panel has, for a total thickness of less than that of the conventional insulating glazing panels, markedly improved thermal insulation properties.

Patent Application EP-A-0,645,516 describes an insulating glazing panel composed of two glass sheets separated from each other by a small space in which a vacuum has been created. The glass sheets are separated from each other by mounts distributed over the entire surface and joined together around their periphery by an inorganic seal. The structure of such a glazing panel gives it a rigidity and a strength which are equivalent to those of a monolithic glazing panel of thickness equal to the sum of the thicknesses of the glass sheets, i.e., the glass sheets behave as a single sheet. It is therefore advantageous to employ this type of glazing panel in SG-type arrangements because their mechanical behavior, and therefore their ability to bend, can be controlled.

According to one embodiment of the invention, the peripheral seal of the hole has at least the same mechanical strength as the peripheral seal of the glazed element.

According to a preferred embodiment of the invention, the peripheral seal of the hole has the same compressive strength as the peripheral seal of the glazed element and, according to another preferred embodiment, it has the same shear strength as the peripheral seal of the glazed element.

In this way, the presence of such a seal between the two glass sheets instead of the fastener makes it possible to clamp the glazed element as effectively and as simply as a monolithic glazing panel. The glazed element according to the invention thus makes it possible to use mechanical fittings for bolting the glazing, the bolting being simpler and easier to carry out than in the case of the usual insulating glazing panels.

According to one variant of the invention, the glass sheets of the glazed element are subjected to a tempering treatment. This tempering makes it possible to increase the strength of the glass sheets when creating the vacuum, and to increase the overall strength of the glazed element in its various applications.

According to one aspect of the invention, the glass sheets of the glazed element have a thickness of 2 millimeters. The mechanical behavior of the glazed element thus obtained is equivalent to that of a monolithic glazing panel having a thickness of 4 millimeters. This type of glazed element advantageously has a small thickness for markedly improved thermal insulation properties.

Moreover, at least one of the glass sheets advantageously has a low-emissivity coating on its internal face, i.e., on a face in contact with the mounts. This coating can contribute to the thermal insulation function.

The invention also provides the glazed element as described above, provided with at least one fastening unit for bolting the glazed element to a bearing structure.

According to a first embodiment, the fastening unit goes through a hole made in the glazed element and the shape of the hole is such that the fastening unit is clamped to all of the glass sheets of which the glazed element is composed. This type of construction is allowed by virtue of the structure of the glazed element and, in particular, of its mechanical behavior equivalent to that of a monolithic glazing panel.

According to a second embodiment, the fastening unit goes through a hole made in the glazed element and the shape of the hole is such that the fastening unit is clamped to only one of the glass sheets of which the glazed element is composed. This construction is possible by the mechanical properties of the seals, which are designed to withstand shear and compressive stresses, so as to prevent them from deteriorating when creating the vacuum in the assembly.

Advantageously, whatever the embodiment chosen, the front face of the fastening unit is level with one of the external faces of the glazed element. The bolting is then said to be of the flush type. Once fastened in this way, the glazed element appears from the outside to be devoid of any "projecting" fastening element, this being particularly pleasing from an aesthetic standpoint.

The subject of the invention is also the use of the above defined glazed element. A first use relates to the construction of large-area curtain walling for buildings. A second use relates to the construction of doors or walls of environmental chambers. This type of application has the advantage of achieving, for a small wall thickness, very high and very good thermal insulation for this kind of use, which thermal insulation cannot be achieved with the usual insulating glazing panels having an overall thickness satisfying the criteria of size and of visibility.

A third envisaged use relates to the construction of roofing, the glazed elements acting as covering tiles or panels.

BRIEF DESCRIPTION OF THE DRAWINGS

The advantageous features of the invention will appear more clearly in the detailed description below of non-limiting illustrative embodiments illustrated by the figures, in which.

DESCRIPTION OF THE PREFERRED EMBODIMENTS

Figure 1:
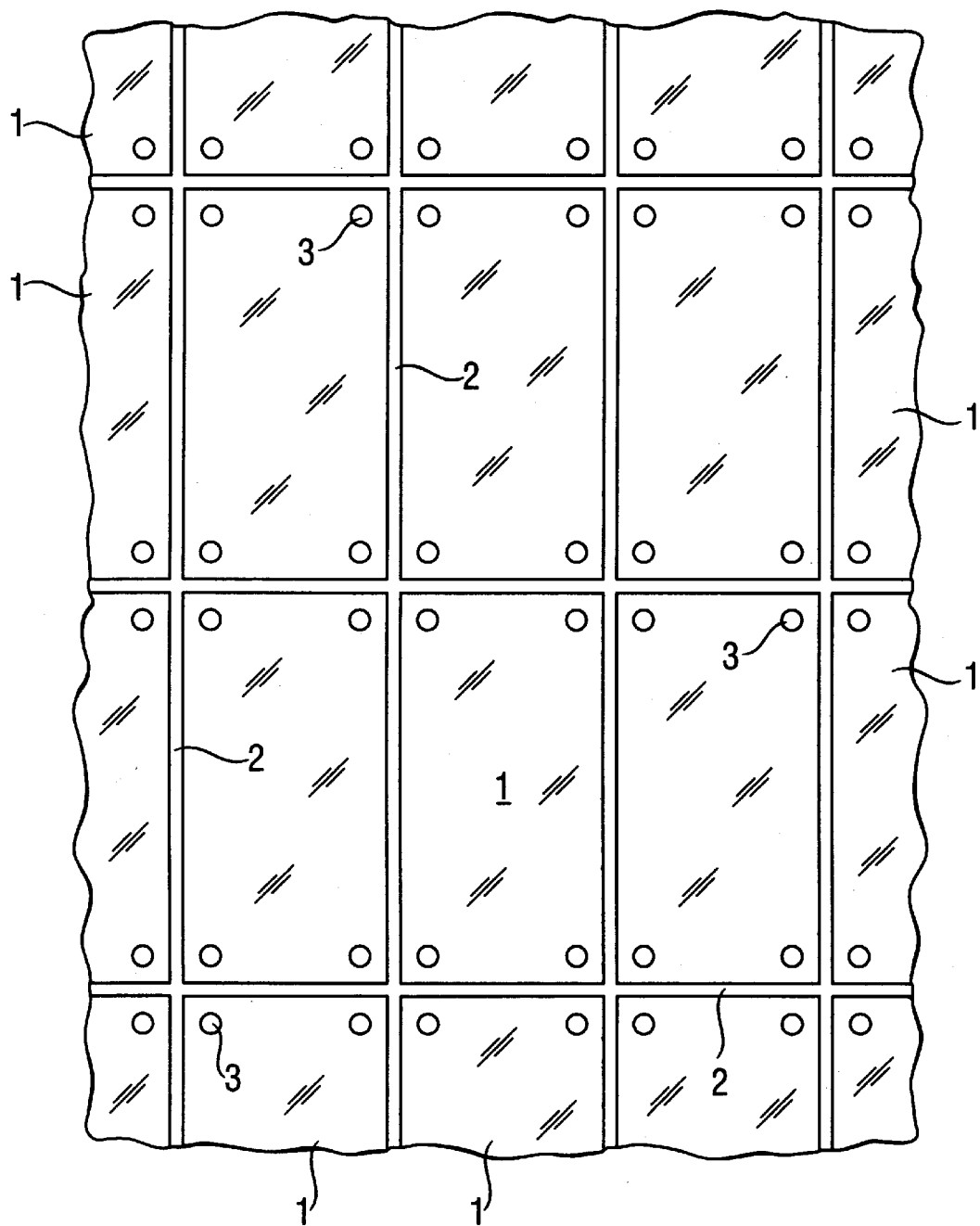
FIG. 1 is an exterior view of a facade equipped with glazed elements according to the invention.

Referring now to the drawings, wherein like reference numerals designate identical or corresponding parts throughout the several views and in which the proportions may not be drawn to scale, and more particularly to FIG. 1 thereof, a facade consists of glazed elements 1 having a high insulating ability. Glazing elements I are separated by narrow compressible seals 2 and are each mechanically fastened to a bearing structure at its four corners at bolting points 3 such that the exterior surface has no projecting elements anywhere. Fastening points other than those located in the corners are also possible.

FIGS. 2a–2c and 3a–3c depict embodiments of a glazed element 1 having a hole 9 whose shape varies depending on the desired mode of bolting. This glazed element 1 consists of two glass sheets 4 and 5, between which a vacuum 6 has been created, separated from each other by mounts 7 distributed over the entire surface, these sheets being joined together around their periphery by an inorganic seal 8. The hole 9 is sealed around its periphery by an inorganic seal 10. The glass sheets 4 and 5 each have a thickness of 4 millimeters.

In these embodiments, the glass sheet 4 is coated on its internal face with a low-emissivity coating 11. This coating is, for example, of the type described in French patent no. 2 701 474 filed in the name of Saint-Gobain Vitrage International. The mounts 7 have a thickness of 0.2 millimeters and a diameter of 0.4 millimeters. They are distributed over the entire surface of the glass sheets and are separated from one another by 30 millimeters.

The mounts 7 are deposited on one of the glass sheets 4 and 5 after they have been coated with a low-emissivity coating 11, for example by chemical vapor deposition. These sheets are fashioned separately in order to form the hole 9, and are then tempered. After depositing a bead of glass frit around the periphery of the second glass sheet and of the hole in the latter, the two glass sheets are joined together so that the two holes lie opposite each other in order to form the hole 9, and then the whole assembly in subjected to a heat treatment in order to weld the two glass sheets 4 and 5 together, the seals 8 and 10 then sealing the assembly. The vacuum between the two sheets 4 and 5 is then created using any means known to those skilled in the art such as, for example, the process described in the French patent application filed in the name of Saint-Gobain Vitrage under the number 96/09 632. The glazed element 1 is then ready to be used.

Figure 2A:
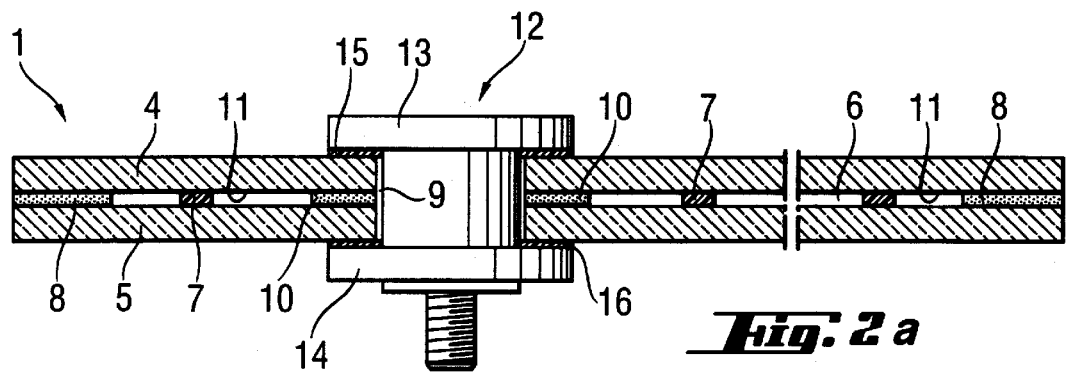
FIGS. 2a, 2b and 2c are cross-sections of embodiments of glazed elements having a high insulating ability and fitted with a fastening unit clamped to all of the glass sheets.

FIG. 2a shows a first embodiment of a glazed element 1 fitted with a fastening unit 12 clamped to both of the glass sheets 4 and 5. The fastening unit 12 consists of a bolt 13 inserted into the hole 9, a locking/clamping element 14 clamped to the bolt, and washers 15 and 16 made of a softer material than that of the bolt 13, such as, for example, aluminum, the bolt 13 being preferably made of stainless steel At the hole 9 in the glazed element 1, the exterior glass sheet 4 is drilled with a circular hole and the interior glass sheet 5 is drilled with a circular hole of the same diameter and centered with respect to the previous one. The stainless steel bolt 13 having a cylindrical head whose diameter is greater than that of the hole 9, passes through the glazed element 1. The head of the bolt 13 bears on the surface of the glass sheet 4 with interposition of the washer 15, making it possible to obtain better contact without the risk of damaging the edge of the hole in the glass sheet 4. The locking/ clamping element 14 screws onto the bolt 13 and is pressed against the glass sheet 5 via the washer 16. The fastening unit 12 is thus clamped to both glass sheets 4 and 5 in contact with each other via the seal 10, the mechanical properties of which allow it to withstand the compressive forces exerted by the fastening unit 12. This type of fitting is easy to accomplish, but has the drawback of not being of the flush type.

Figure 2B:
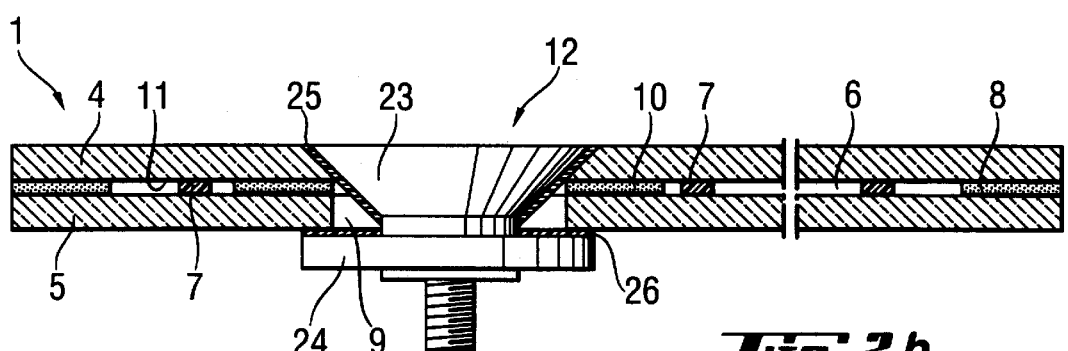

FIG. 2*b* shown a second embodiment of a glazed element 1 fitted with a fastening unit 12 clamped to both of the glass sheets 4 and 5. The fastening unit 12 consists of a stainless steel screw 23 which is inserted into the hole 9, of a locking/clamping element 24 and of washers 25 and 26 made of aluminum.

At the hole 9, the glass sheet 4 is drilled with a countersunk circular hole and the glass sheet 5 is drilled with a non-countersunk circular hole whose diameter is identical to the inside diameter of the first hole and centered with respect to it. The countersunk head bolt 23 passes through the glazed element 1 and bears on the glass sheet 4 so as to be flush with the exterior surface of the latter, the washer 25 being interposed between the glass sheet 4 and the head of the bolt 23. The locking/clamping element 24 screws onto the bolt 23 and is pressed against the glass sheet 5 via the washer 26. The fastening unit 12 is then clamped to both of the sheets 4 and 5 in contact with each other via the seal 10.

Figure 2C:
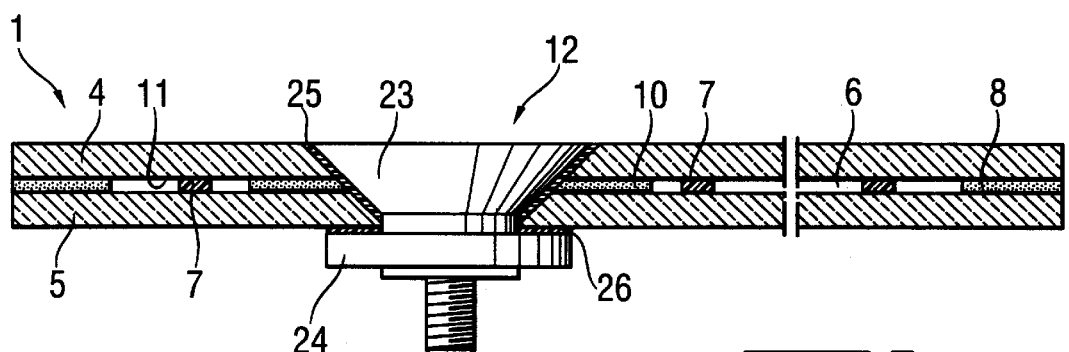

FIG. 2*c* shows a third embodiment of a glazed element 1 fitted with a fastening unit 12 clamped to both of the sheets 4 and 5. The fastening unit 12 is identical to that in FIG. 2*b*, but the glass sheet 4 is drilled with a countersunk circular hole and the glass sheet 5 is drilled with a countersunk circular hole of smaller diameter and centered on the previous one, so that when the two sheets 4 and 5 are joined together via the seal 10, the internal surface of the hole 9 forms a uniformly conical surface. The head of the bolt 23 bears via the washer 25 on the surface of the hole 9 so as to be flush with the exterior surface of the glass sheet 4. The locking/clamping element 24 screws onto the bolt 23 and is pressed against the glass sheet 5 via the washer 26. The fastening unit 12 is thus clamped to both of the sheets 4 and 5 in contact with each other via the seal 10 and, with respect to the arrangement shown in FIG. 2*b*, the contact between the bolt head and the glazed element 1 offers better distribution of the forces generated by clamping the fastening unit 12.

Figure 3A:
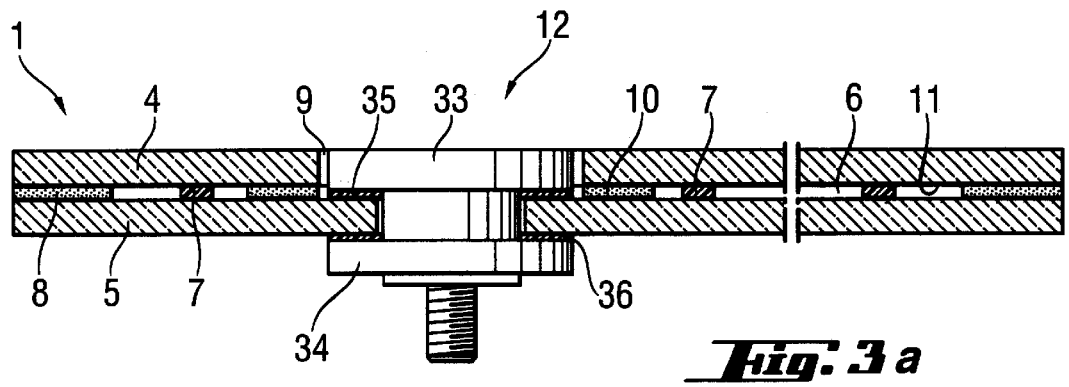
FIGS. 3a, 3b and 3c are cross-sections of embodiments of glazed elements having a high insulating ability and fitted with a fastening unit clamped to one of the glass sheets.

FIG. 3*a* shows a first embodiment of a glazed element 1 fitted with a fastening unit 12 clamped to one of the two glass sheets 4 and 5 thereof. The fastening unit 12 consists of a stainless steel bolt 33 which is inserted into the hole 9, of a locking/clamping element 34 and of washers 35 and 36 made of aluminum.

At the hole 9 in the glazed element 1, the glass sheet 4 is drilled with a circular hole and the glass sheet 5 is drilled with a circular hole of smaller diameter and centered on the previous one. The cheese head bolt 33, of diameter less than that of the hole in the glass sheet 4 and greater than that in the glass sheet 5, passes through the glazed element 1. The head of the bolt 33 bears against the internal surface of the glass sheet 5 via the washer 35. The locking/clamping element 34 screws onto the bolt 33 and is pressed against the glass sheet 5 on the internal side via the washer 36. The fastening unit 12 is thus clamped to the glass sheet 5, the height of the head of the bolt 33 being such that the front face of the latter is at the same level as the exterior surface of the glass sheet 4. This type of fitting is easy to accomplish and has the advantage of being of the flush type.

Figure 3B:
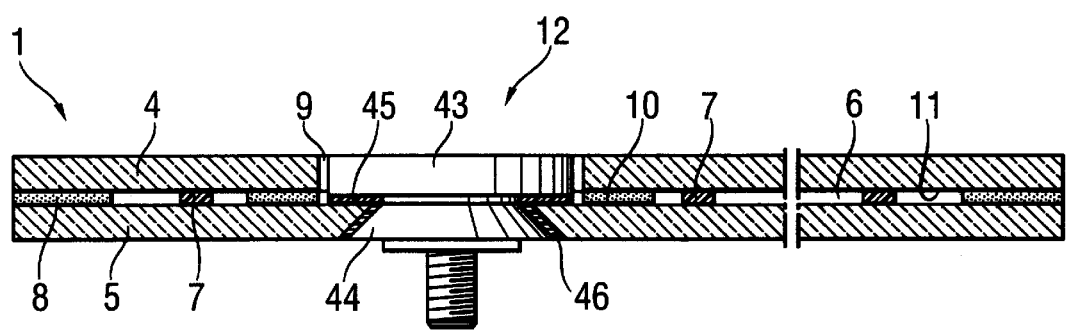

FIG. 3*b* shows a second embodiment of a glazed element 1 fitted with a fastening unit 12 clamped to one of the two glass sheets 4 and 5 of which the glazed element 1 is composed. The fastening unit 12 consists of a stainless steel bolt 43 which is inserted into the hole 9, of a locking/ clamping element 44 and of washers 45 and 46 made of aluminum.

At the hole 9 in the glazed element 1, the glass sheet 4 is drilled with a circular hole and the glass sheet 5 is drilled with a countersunk circular hole centered on the previous one, the outside diameter of which is less than the diameter of the hole in the glass sheet 4. The cheese head bolt 43, whose diameter is smaller than that of the hole in the glass sheet 4 and greater than the external diameter of the hole in the glass sheet 5, passes though the glazed element 1. The head of the bolt 43 bears against the internal surface of the glass sheet 5 via the washer 45. The cone-shaped locking/ clamping element 44 screws onto the bolt 43 and bears against the glass sheet 5 so as to be flush with the exterior surface of the latter, the washer 46 being interposed between the glass sheet 5 and the locking/clamping element 44. The fastening unit 12 is thus clamped to the glass sheet 5, the height of the head of the bolt 43 being such that the front face of the latter is at the same level as the exterior surface of the glass sheet 4.

Figure 3C:
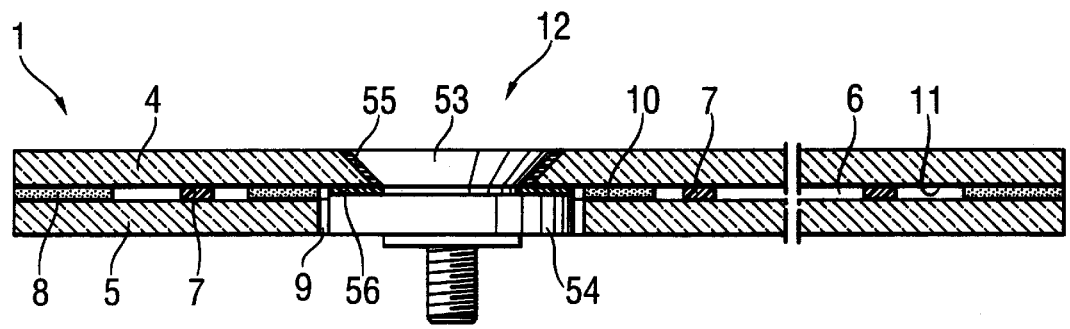

FIG. 3*c* shows a third embodiment of a glazed element 1 fitted with a fastening unit 12 clamped to one of the two glass sheets 4 and 5 of which the glazed element 1 is composed. The fastening unit 12 consists of a stainless steel countersunk head bolt 53 which is inserted into the hole 9, of a locking/clamping clement 54 and of washers 55 and 56 made of aluminum.

At the hole 9 of the glazed element 1, the glass sheet 4 is drilled with a countersunk circular hole and the glass sheet 5 is drilled with a circular hole centered on the previous one, the diameter of which is greater than the external diameter of the hole in the glass sheet 4. The countersunk head bolt 53 bears against the glass sheet 4 so as to be flush with the exterior surface of the latter, the washer 55 being interposed between the glass sheet 4 and the head of the screw 53. The locking/clamping element 54 screws onto the bolt 53 and is pressed against the glass sheet 4 on the internal side via the washer 56. The fastening unit 12 is thus clamped to the glass sheet 4.

Clamping the fastening unit 12 to one of the two glass sheets 4 and 5 of the glazed element 1 is generally the simplest and easiest embodiment to implement. The stability over time of the bolted glazed element 1 is advantageously provided by the actual structure of the latter and more particularly by the mechanical properties of the seals 8 and 10.

Advantageously, the fastening unit can be completely fitted to the glazed element in the field. Thus, there is no problem of storing or transporting the glazed elements, it being possible for the latter to be delivered in their simplest form, i.e. without any fastening units. In addition, the operation of bolting these glazed elements is simple.

Obviously, numerous modifications and variations of the present invention are possible in light of the above teachings. It is therefore to be understood that within the scope of the appended claims, the invention may be practiced otherwise than as specifically described herein.

What is claimed is:

1. Glazed element having a high insulating ability, comprising:
   at least two glass sheets between which a vacuum has been created, wherein each of said sheets has a hole;
   a plurality of mounts distributed over the surfaces of said sheets so as to separate said sheets from each other;
   a first inorganic seal around the periphery of the sheets and joining the sheets together such that said holes are substantially aligned; and
   a second inorganic seal around the periphery of the holes, said second inorganic seal comprising a hardened glass frit which joins the sheets together thereby sealing the holes in a vacuum-tight manner.

2. Glazed element according to claim 1, wherein the second peripheral seal has at least the same mechanical strength as the first peripheral seal.

3. Glazed element according to claim 2, wherein the second peripheral seal has the same compressive strength as the first peripheral seal.

4. Glazed element according to claim 2, wherein the second peripheral seal has the same shear strength as the first peripheral seal.

5. Glazed element according to claim 1, wherein the glass sheets are tempered.

6. Glazed element according to claim 1, wherein the glass sheets have a minimum thickness of 2 millimeters.

7. Glazed element according to claim 1, wherein at least one of the glass sheets has a low-emissivity coating on a face thereof in contact with the mounts.

8. Glazed element according to claim 1, further comprising at least one fastening unit for bolting said glazed element to a bearing structure, wherein the fastening unit extends through only one of said holes in each of said at least two glass sheets and wherein the shape of the holes in the remaining at least two glass sheets is such that the fastening unit is clamped only to said one of said at least two glass sheets.

9. Glazed element having a high insulating ability, comprising:
   at least two glass sheets between which a vacuum has been created, wherein each of said sheets has a hole;
   a plurality of mounts distributed over the surfaces of said sheets so as to separate said sheets from each other;
   a first inorganic seal around the periphery of the sheets and joining the sheets together such that said holes are substantially aligned;
   a second inorganic seal around the periphery of the holes, said second inorganic seal comprising a hardened glass frit which joins the sheets together thereby sealing the holes in a vacuum-tight manner;
   at least one fastening unit for bolting the glazed element to a bearing structure, wherein the fastening unit extends through said aligned holes and wherein the shape of the holes are such that the fastening unit is clamped to all of said glass sheets.

10. Glazed element according to claim 9, wherein the fastening unit is flush with an exterior surface of the glazed element.

11. A building wall comprised of a plurality of glazed elements, each glazed element having a high insulating ability and comprising at least two glass sheets between which a vacuum has been created, wherein each of said sheets has a hole; a plurality of mounts distributed over the surfaces of said sheets so as to separate said sheets from each other; a first inorganic seal around the periphery of the sheets and joining the sheets together such that said holes are substantially aligned; and a second inorganic seal around the periphery of the holes, said second inorganic seal comprising a hardened glass frit which joins the sheets together thereby sealing the holes in a vacuum-tight manner.

12. A surface environmental chamber comprised of at least one glazed element having a high insulating ability and comprised of at least two glass sheets between which a vacuum has been created, wherein each of said sheets has a hole; a plurality of mounts distributed over the surfaces of said sheets so as to separate said sheets from each other; a first inorganic seal around the periphery of the sheets and joining the sheets together such that said holes are substantially aligned; and a second inorganic seal around the periphery of the holes, said second inorganic seal comprising a hardened glass frit which joins the sheets together thereby sealing the holes in a vacuum-tight manner.

13. A roof comprised of at least one glazed element having a high insulating ability and comprising at least two glass sheets between which a vacuum has been created, wherein each of said sheets has a hole; a plurality of mounts distributed over the surfaces of said sheets so as to separate said sheets from each other; a first inorganic seal around the periphery of the sheets and joining the sheets together such that said holes are substantially aligned; and a second inorganic seal around the periphery of the holes, said second inorganic seal comprising a hardened glass frit which joins the sheets together thereby sealing the holes in a vacuum-tight manner.

* * * * *

UNITED STATES PATENT AND TRADEMARK OFFICE
CERTIFICATE OF CORRECTION

PATENT NO. : 6,138,434

DATED : October 31, 2000

INVENTOR(S): Yves DEMARS, et al.

It is certified that an error appears in the above-identified patent and that said Letters Patent is hereby corrected as shown below:

On the Title page, Item [73], the Assignee information is listed incorrectly.
Item [73] should read as follows:

--- [73] Assignee: Saint-Gobain Vitrage, Courbevoie, France ---

Signed and Sealed this

Twenty-second Day of May, 2001

Attest:

NICHOLAS P. GODICI

Attesting Officer

Acting Director of the United States Patent and Trademark Office